United States Patent
Okayasu et al.

(10) Patent No.: US 6,968,455 B2
(45) Date of Patent: Nov. 22, 2005

(54) METHOD OF REFERRING TO DIGITAL WATERMARK INFORMATION EMBEDDED IN A MARK IMAGE

(75) Inventors: Satoe Okayasu, Ohmiya (JP); Takashi Shinoda, Nagareyama (JP); Hiroshi Asakai, Hadano (JP)

(73) Assignee: Hitachi, Ltd., Tokyo (JP)

( * ) Notice: Subject to any disclaimer, the term of this patent is extended or adjusted under 35 U.S.C. 154(b) by 672 days.

(21) Appl. No.: 09/779,855

(22) Filed: Feb. 9, 2001

(65) Prior Publication Data

US 2001/0021978 A1 Sep. 13, 2001

(30) Foreign Application Priority Data

Mar. 10, 2000 (JP) ........................... 2000-072455

(51) Int. Cl.⁷ ................................................. H04L 9/00
(52) U.S. Cl. ..................................... 713/176; 713/162
(58) Field of Search ................................ 713/176, 162

(56) References Cited

U.S. PATENT DOCUMENTS 5,841,978 A * 11/1998 Rhoads ...................... 709/217
6,754,822 B1 * 6/2004 Zhao ........................... 713/176

FOREIGN PATENT DOCUMENTS

| EP | 0936531 | 8/1999 |
| EP | 0982930 | 3/2000 |
| WO | 9957623 | 11/1999 |

* cited by examiner

*Primary Examiner*—Gregory Morse
*Assistant Examiner*—Jacob Lipman
(74) *Attorney, Agent, or Firm*—Mattingly, Stanger, Malur & Brundidge, P.C.

(57) ABSTRACT

A browser 21 of a mark user client 3 obtains Web page 11 from a mark provider server 2 and displays it. Then control is transferred to a mark reference program 22 when a mark is detected, and the program extracts digital watermark information from a mark image. This digital watermark information comprises referred data, and an action definition that includes an action class and an index of the referred data as a parameter. The mark reference program 22 refers to this action definition, refers to required data through the index included in the action definition, and then performs processing defined by the action class.

8 Claims, 17 Drawing Sheets

FIG. 4

| INFORMATION OF THE MARK PROVIDER | |
|---|---|
| THE ENTREPRENEUR WHO UTILIZES THIS MARK HAS BEEN ADMITTED TO QUALIFY FOR UTILIZING THE AUTHENTICATION MARK BASED ON THE STANDARD OF THE MARK PROTOCOL BY YYY. | |
| ①THE NAME OF MARK PROVIDER | : EC STORE CO. LTD. |
| ②THE NAME OF REPRESENTATIVE | : PRESIDENT YAMADA TARO |
| ③POSTCODE | : 100-0035 |
| ④ADDRESS | : 3-2-2 MARUNOUCHI CHIYODAKU, TOKYO |
| ⑤THE ADMITTED URL | : http://www.ecstore.co.jp |

YOU CAN ENSURE THE FACT ONLINE BY PRESSING [INQUIRY TO AUTHENTICATION SERVER] BUTTON.

[ OK ]

[ INQUIRY TO AUTHENTICATION SERVER ]

[ INFORMATION OF THE PROMOTER ]

FIG. 5

```
THIS MARK HAS BEEN ISSUED AS THE AUTHENTICATION
STANDARD BY YYY HAS ADMITTED THE ENTREPRENEUR
BELOW TO BE QUALIFIED.

①THE NAME OF MARK PROVIDER   : EC STORE CO. LTD.
②THE NAME OF REPRESENTATIVE  : PRESIDENT YAMADA TARO
③POSTCODE                    : 100-0035
④ADDRESS                     : 3-2-2 MARUNOUCHI
                               CHIYODAKU, TOKYO
⑤THE ADMITTED URL            : http://www.ecstore.co.jp
```

FIG. 6

| EXPLANATION OF MARK PROTOCOL |
|---|
| THE YYY MARK PROTOCOL IS··· BOTH A HOMEPAGE URL PROVIDED BY THE YYY ADMITTED ENTREPRENEUR AND THE EFFECTIVE PERIOD OF THE MARK ARE EMBEDDED IN THIS MARK. ···YOU CAN REFER TO THE UP-TO-DATE INFORMATION. |

[ OK ]

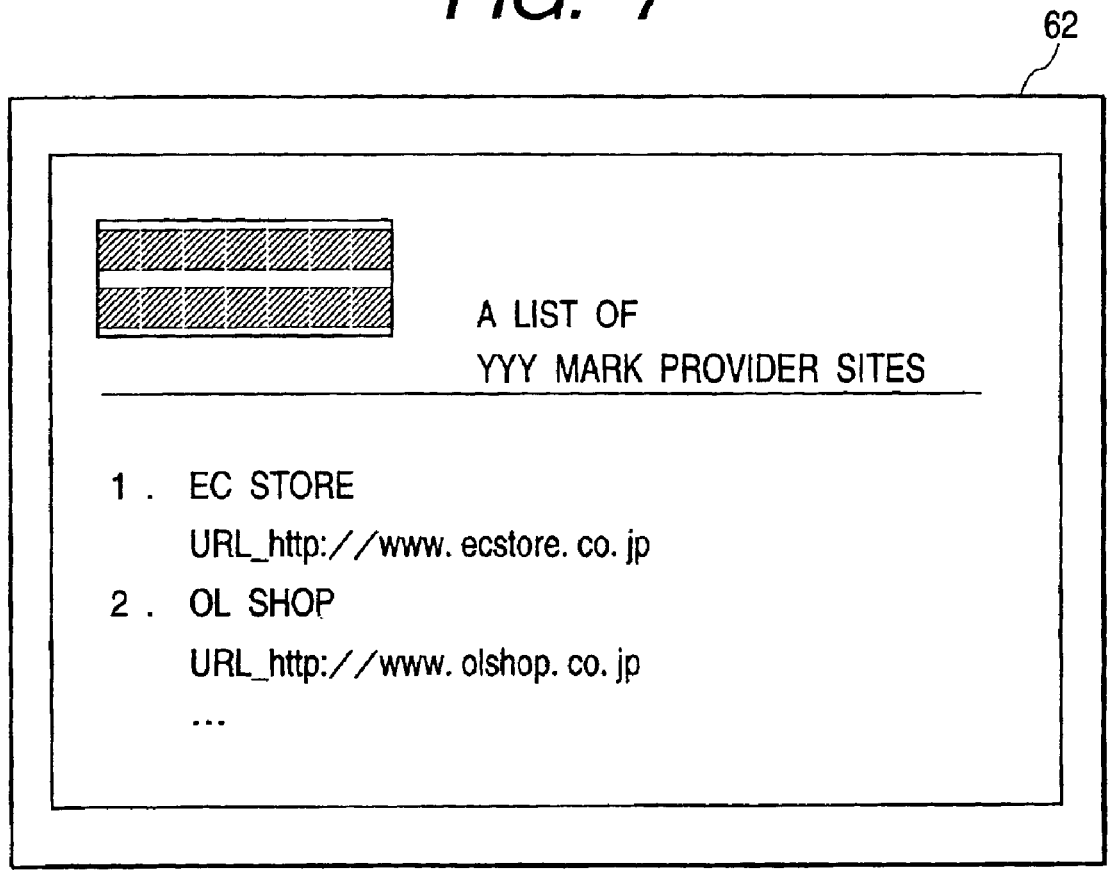

FIG. 10A

| CODE | DATA CLASS | DATA | |
|---|---|---|---|
| D1 | CHARACTER CODE | CHARACTER CODE | |
| D2 | OBJECT NATION CODE | NATION CODE | |
| D3 | NAME OF MARK ISSUER | NAME OF MARK ISSUER | |
| D4 | MARK ISSUER URL | MARK ISSUER URL | |
| D5 | NAME OF MARK PROMOTER | NAME OF MARK PROMOTER | |
| D6 | MARK PROMOTER URL | MARK PROMOTER URL | |
| D7 | INDIVIDUAL MARK ID | INDIVIDUAL MARK ID | |
| D8 | INITIALIZATION | DEFINITION ITEM OF MARK DISPLAY ACTION | |
| | | DEFINITION ITEM OF INITIAL ACTION | |
| D9 | DEFINITION OF MENU CONFIGURATION | NUMBER OF MENU ITEMS | |
| | | A LIST OF ACTION DEFINITION ITEMS | |
| D10 | DEFINITION OF MARK DISPLAY AFTER OFF-LINE AUTHENTICATION | NUMBER OF ACTIONS | |
| | | A LIST OF DEFINITION ITEMS OF MARK DISPLAY ACTION | |
| D11 | DEFINITION OF TEXT DISPLAY AFTER OFF-LINE AUTHENTICATION | NUMBER OF ACTIONS | |
| | | A LIST OF DEFINITION ITEMS OF TEXT DISPLAY ACTION | |
| D12 | ATTACHED URL | NUMBER OF ATTACHED URLS | |
| | | NOT OMISSIBLE PORTION OF ATTACHED URL | |
| | | OMISSIBLE PORTION OF ATTACHED URL | |

FIG. 10B

| CODE | DATA CLASS | DATA |
|---|---|---|
| D13 | ATTACHED IP ADDRESS INFORMATION | NUMBER OF ATTACHED IP ADDRESSES |
| | | IP VERSION CODE OF SERVER IP ADDRESS ON ATTACHED PAGE |
| | | IP ADDRESS DATA |
| D14 | START OF MARK PERIOD | STARTING YEAR, MONTH, DAY, HOUR, MIN. |
| D15 | END OF MARK PERIOD | ENDING YEAR, MONTH, DAY, HOUR, MIN. |
| D16 | CHARACTERISTIC VALUE OF THE CONTENTS | CHARACTERISTIC VALUE |
| D17 | AUTHENTICATION SERVER URL | URL |
| D18 | ACTION FOR MOUSE HOVER | ACTION ITEM NUMBER |
| D19 | ACTION FOR MOUSE LEAVE | ACTION ITEM NUMBER |
| D20 | ACTION FOR PRESSING OF MOUSE LEFT BUTTON | ACTION ITEM NUMBER |
| D21 | ACTION FOR PRESSING OF MOUSE RIGHT BUTTON | ACTION ITEM NUMBER |
| D22 | ACTION DEFINITION | ACTION NAME |
| | | ACTION CLASS CODE |
| | | ACTION CLASS SPECIFIC DATA |
| D23 | GENERAL PURPOSE INFORMATION OF IP ADDRESS | IP VERSION CODE |
| D24 | GENERAL PURPOSE URL | URL |
| D25 | TEXT | TEXT |

FIG. 11A

| CODE | ACTION CLASS | ACTION DATA |
|---|---|---|
| A1 | MENU DISPLAY | NONE |
| A2 | OFF-LINE AUTHENTICATION | DEFINITION ITEM OF MARK DISPLAY AFTER AUTHENTICATION |
| A2 | OFF-LINE AUTHENTICATION | DEFINITION ITEM OF TEXT DISPLAY AFTER AUTHENTICATION |
| A3 | BALLOON DISPLAY | ITEM NUMBER OF DISPLAYED TEXT |
| A4 | TEXT DISPLAY | ITEM NUMBER OF DISPLAYED TEXT |
| A4 | TEXT DISPLAY | NUMBER OF OBJECTS INSERTED IN THE TEXT |
| A4 | TEXT DISPLAY | OBJECT INFORMATION INSERTED IN THE TEXT |
| A4 | TEXT DISPLAY | NUMBER OF ADDITIONAL BUTTONS |
| A4 | TEXT DISPLAY | A LIST OF DEFINITION ITEMS OF ACTION FOR ADDITIONAL BUTTON |
| A5 | Web PAGE DISPLAY | URL ITEM NUMBER |
| A5 | Web PAGE DISPLAY | ACTION ITEM NUMBER ON EXTINCTION OF LINK DESTINATION |
| A6 | COMMUNICATIONS WITH SERVER | SERVER URL ITEM NUMBER |
| A6 | COMMUNICATIONS WITH SERVER | REQUEST CLASS CODE |
| A6 | COMMUNICATIONS WITH SERVER | RESPONSE PROCESSING CODE |
| A7 | MARK DISPLAY | IMAGE EFFECT CODE |
| A7 | MARK DISPLAY | SYNTHESIZED TEXT |
| A7 | MARK DISPLAY | TEXT BODY COLOR CODE |
| A7 | MARK DISPLAY | TEXT FRAME COLOR CODE |
| A7 | MARK DISPLAY | FONT CODE |

FIG. 11B

| CODE | ACTION CLASS | ACTION DATA |
|---|---|---|
| A8 | EXECUTION OF ADD-ON PROGRAM | PROGRAM DESCRIPTION BY SCRIPT |
| A9 | LINK CHECK | GENERAL PURPOSE URL ITEM NUMBER |
| A9 | LINK CHECK | ACTION ON OK ITEM NUMBER |
| A9 | LINK CHECK | ACTION ON NG ITEM NUMBER |

FIG. 12A

| ITEM NO. | D CODE | DATA |
|---|---|---|
| 1 | D1 | "JIS" |
| 2 | D2 | "JP" |
| 3 | D3 | "XXX MARK CENTER" |
| 4 | D4 | "http://www. olmkcenter. or. jp" |
| 5 | D5 | "YYY MARK HEADQUARTER CENTER" |
| 6 | D6 | "http://www. olmkhq. or. jp" |
| 7 | D7 | "9999-A00001-1-04" |
| 8 | D8 | 17\|15 |
| 9 | D9 | 3\|18\|19\|20 |
| 10 | D10 | 3\|21\|22\|24 |
| 11 | D11 | 3\|26\|23\|25 |
| 12 | D18 | 14 |
| 13 | D20 | 16 |
| 14 | D22 | " "\|A3\|32 |
| 15 | D22 | " "\|A2\|10\|0 |
| 16 | D22 | " "\|A1 |

FIG. 12B

| ITEM NO. | D CODE | DATA |
|---|---|---|
| 17 | D22 | " "|A7|5|"IN AUTHENTICATION"|4|4|2 |
| 18 | D22 | "INFORMATION OF THE MARK PROVIDER"|A2|10|11 |
| 19 | D22 | "EXPLANATION OF MARK PROTOCOL"|A4|33|0|0 |
| 20 | D22 | "A LIST OF MARK PROVIDERS"|A5|30 |
| 21 | D22 | " "|A7|0|" " |
| 22 | D22 | " "|A7|0|"INVALID MARK USE"|5|2|2 |
| 23 | D22 | "INVALID MARK USE"|A4|34|2|35|1|1|29 |
| 24 | D22 | " "|A7|0|"EXPIRATION OF EFFECTIVE PERIOD"|5|2|2 |
| 25 | D22 | "EXPIRATION OF EFFECTIVE PERIOD"|A4|36|2|37|S1|1|29 |
| 26 | D22 | " "|A4|38|5|39|40| 41|42|35|2|27|28 |
| 27 | D22 | "INQUIRY TO AUTHENTICATION SERVER"|A6|31|1|3 |
| 28 | D22 | "INFORMATION OF THE PROMOTER"|A5|6 |
| 29 | D22 | "WARNING TO AUTHENTICATION SERVER"|A6|31|2|4 |
| 30 | D24 | "http://www.ichiran.or.jp" |
| 31 | D17 | "http://www.ninsho.or.jp" |

FIG. 12C

| ITEM NO. | D CODE | DATA |
|---|---|---|
| 32 | D25 | "AUTHENTICATION INFORMATION IS DISPLAYED BY A CLICK." |
| 33 | D25 | "THE YYY MARK PROTOCOL IS···YOU CAN REFER TO THE UP-TO-DATA INFORMATION" |
| 34 | D25 | "THE ATTACHED URL IS NOT CORRECT. ¥n    CORRECT   : %E¥n    INCORRECT: %s¥n ON PRESSING THE [WARNING TO AUTHENTICATION SERVER] BUTTON,···PLEASE PRESS THE BUTTON." |
| 35 | D13 | 1\|"http://www.ecstore.co.jp/"\|"index.html" |
| 36 | D25 | "THE EFFECTIVE PERIOD OF THE MARK HAS EXPIRED. ¥n    EFFECTIVE PERIOD: %T¥n    CURRENT TIME    : %U¥n ON PRESSING THE [WARNING TO AUTHENTICATION SERVER] BUTTON,···PLEASE PRESS THE BUTTON." |
| 37 | D15 | "200104" |

FIG. 12D

| ITEM NO. | D CODE | DATA |
|---|---|---|
| 38 | D25 | "THE ENTREPRENEUR WHO UTILIZES THIS MARK HAS BEEN ADMITTED TO QUALIFY FOR UTILIZING THE AUTHENTICATION MARK BASED ON THE STANDARD OF THE MARK PROTOCOL BY YYY. ¥n ¥n ①THE NAME OF MARK PROVIDER : %E¥n ②THE NAME OF REPRESENTATIVE: %E¥n ③POSTCODE : %E¥n ④ADDRESS : %E¥n ⑤THE ADMITTED URL : %E¥n ¥n YOU CAN ENSURE THE FACT ONLINE BY PRESSING [INQUIRY TO AUTHENTICATION SERVER] BUTTON." |
| 39 | D25 | "EC STORE CO. LTD." |
| 40 | D25 | "PRESIDENT YAMADA TARO" |
| 41 | D25 | "100-0035" |
| 42 | D25 | "3-2-2 MARUNOUCHI CHIYODAKU, TOKYO" |

FIG. 12E

| ITEM NO. | D CODE | DATA |
|---|---|---|
| 1 | D22 | "A LIST OF MARK PROVIDERS"\|A5\|2\|0 |
| 2 | D24 | "http://www.ichiran.or.jp" |
| 3 | D8 | 0\|4 |
| 4 | D22 | " "\|A9\|2\|5\|6 |
| 5 | D22 | " "\|A7\|0\|"OK" |
| 6 | D22 | " "\|A7\|0\|"NG" |

FIG. 12F

| ITEM NO. | D CODE | DATA |
|---|---|---|
| 1 | D18 | 2 |
| 2 | D22 | " "\|A8\|<Script=···<br>•<br>•<br>•<br>DESCRIPTION OF PROCESSING BY SCRIPT<br>•<br>•<br>•<br>>" |

METHOD OF REFERRING TO DIGITAL WATERMARK INFORMATION EMBEDDED IN A MARK IMAGE

BACKGROUND OF THE INVENTION

The present invention relates to a browser page transmitted to a user client via a network such as Internet, and more specifically to a mark image attached to the browser page, digital watermark information embedded in the mark image, and a program that performs processing with reference to the digital watermark information.

As Internet comes into wider use, an Internet mark is often attached to a home page to claim a copyright of the home page transmitted via Internet and thereby to indicate its authenticity. However, because only attaching the Internet mark to the home page cannot protect copy causing an unauthorized use of the home page, the following technique is proposed: using a digital watermark technology, information including a mark issuer, a mark promoter, a mark provider, URL of the mark provider's site, and a mark period are embedded in a mark image; the authenticity of the home page is verified by comparing URL of the home page with the embedded URL of the mark provider and by checking the mark period.

According to the above-mentioned prior art, the digital watermark information embedded in the mark image is limited to such information described above. Therefore, even when processing different kinds of marks, no choice is given but to perform authentication in a routine manner using formula processing procedures such as URL check and mark period check. For this reason, it was difficult to change processing procedures for each kind of the marks and to change text information to be displayed. For example, as an example of the processing procedures, there is a selectable option of either displaying a mark after performing mark authentication automatically or displaying the mark first before performing the mark authentication.

In addition, as regards displaying of selectable actions as a menu when a mark is pointed, it is expected that the number of menu items, their names, and actions to be selected can be designed freely for each kind of marks. Even if the same kind of marks is processed, it is also expected that part of displayed text information can be changed for each mark provider. Moreover, when changing processing procedures and processing itself for each kind of marks, it is recommended that a program referring to a mark or a browser including the program is not changed.

SUMMARY OF THE INVENTION

Objects of the present invention are to provide a data format, which can solve the problems described above, by improving a data format of digital watermark information embedded in a mark image; and to provide a method for performing processing with reference to the digital watermark information having such data format.

The present invention is characterized by digital watermark information in a mark image and a method for referring to digital watermark information in a mark image, the digital watermark information being embedded in the mark image, processing being performed with reference to the digital watermark information, wherein the digital watermark information comprises referred data, and an action definition that includes an action class and an index of the referred data as a parameter, the method comprising a step of referring to the action definition; and a step of referring to the referred data through the index included in the action definition to perform processing defined by the action class.

In addition, the present invention is characterized by digital watermark information, which has such data configuration, as a transmission medium transmitted via a network. Moreover, the present invention is characterized by a browser program, which performs processing according to this method, as a transmission medium transmitted via a network.

BRIEF DESCRIPTION OF THE DRAWINGS

FIG. 4 is a diagram illustrating an example of text information displayed when a menu item of "Information of the Mark Provider" is pointed;

FIG. 5 is a diagram illustrating an example of a Web page obtained from an authentication server as a result of on-line authentication;

FIG. 6 is a diagram illustrating an example of text information displayed when a menu item of "Explanation of Mark Protocol" is pointed;

FIG. 7 is a diagram illustrating an example of a home page displayed when a menu item of "A List of Mark Providers" is indicated;

FIG. 10A is a diagram that defines data classes of embedded data and their contents;

FIG. 10B is a diagram that defines data classes of embedded data and their contents (continued);

FIG. 11A is a diagram that defines action class codes and their specific data;

FIG. 11B is a diagram that defines action class codes and their specific data (continued);

FIG. 12A is a diagram illustrating examples of embedded data entities;

FIG. 12B is a diagram illustrating examples of embedded data entities (continued);

FIG. 12C is a diagram illustrating examples of embedded data entities (continued);

FIG. 12D is a diagram illustrating examples of embedded data entities (continued);

FIG. 12E is a diagram illustrating examples of embedded data entities (continued);

FIG. 12F is a diagram illustrating examples of embedded data entities (continued);

DETAILED DESCRIPTION OF PREFERRED EMBODIMENTS

Embodiments of the present invention will be described with reference to the drawings.

Figure 1:
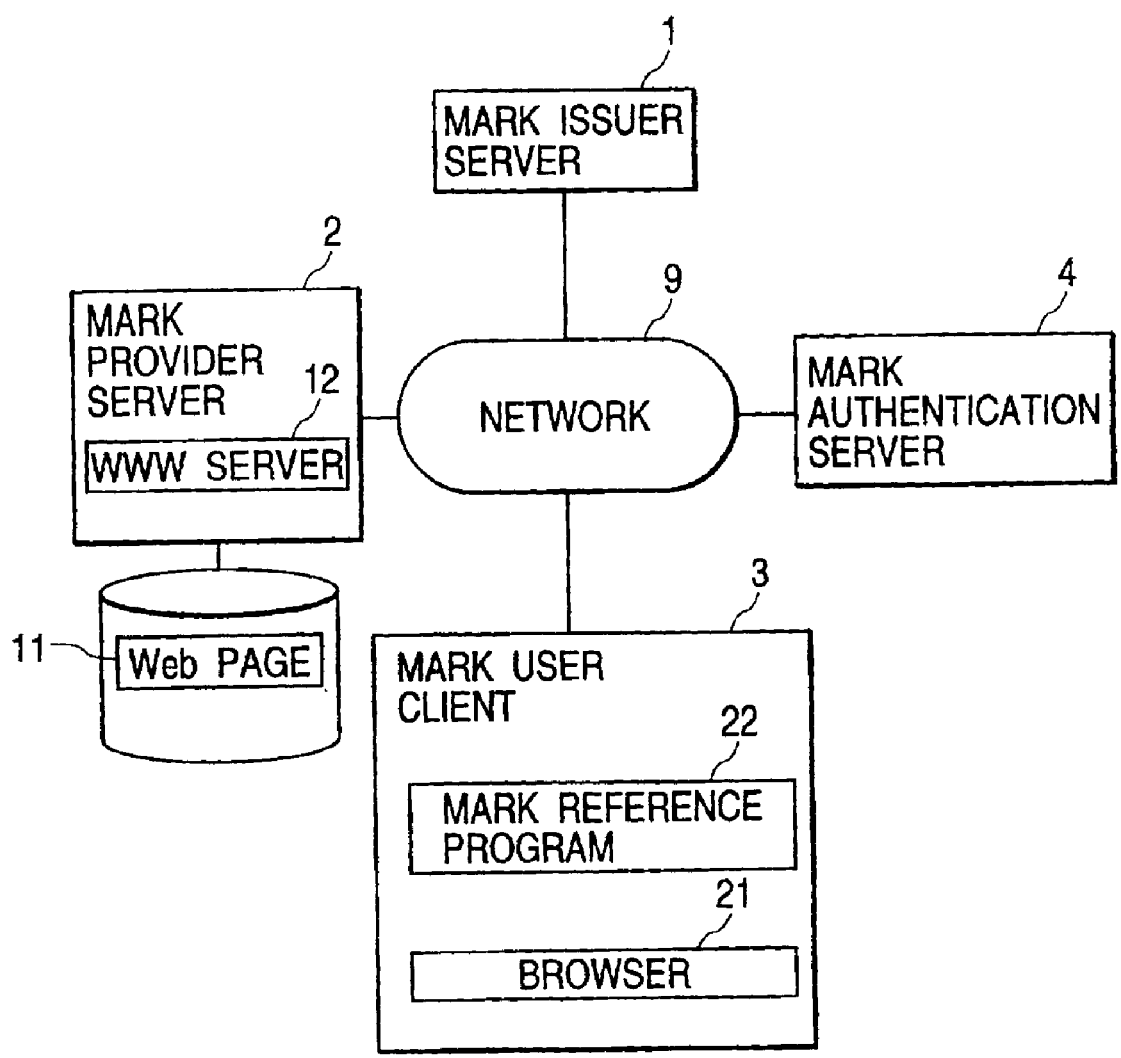
FIG. 1 is a diagram illustrating a system configuration of an embodiment.

FIG. 1 is a diagram illustrating a system configuration of the embodiment. Assuming that an entrepreneur will be allowed to use an authentication mark, a mark issuer server 1 is a server computer for issuing the mark, in which information common to all mark providers of the mark and information specific to the entrepreneur is embedded, to the entrepreneur to provide an authority to use the mark. Generally, besides a mark issuer, there is a mark promoter, and a server of the mark promoter is provided. The mark promoter may be the same organization as the mark issuer. A mark provider server 2 is provided with the authority to use the mark by the mark issuer server 1, and attaches the mark to a Web page of its own. From the standpoint of the mark promoter, the mark provider server 2 is a server computer that is related to the entrepreneur provided with the authority to use the mark. A mark user client 3 is a client computer for accessing the mark provider server 2 to browse Web page 11 to which a mark image is attached. The mark user client 3 has input units such as a keyboard and a mouse, and a display unit. A mark authentication server 4 is a server computer for performing on-line mark authentication in response to a request from the mark user client 3. A network 9 is a network such as Internet, which connects the mark issuer server 1, the mark provider server 2, the mark user client 3, and the mark authentication server 4.

The mark user client 3 has a browser 21 and a mark reference program 22 in its memory. A processing unit of the mark user client 3 executes the browser 21 and the mark reference program 22. When, in the browser 21, URL of the mark provider server 2 site is specified and the Web page 11 is requested through the network 9, WWW (World Wide Web) server 12 of the mark provider server 2 retrieves the Web page in a memory unit and then transmits the specified Web page 11 to the mark user client 3. The browser 21 interprets the received Web page 11 and displays it on the display unit. As soon as the browser 21 detects an extension of the mark, control is passed to the mark reference program 22. The mark reference program 22 extracts digital watermark information embedded in the mark, and performs off-line mark authentication. If the mark attached to the Web page 11 is correct, the mark reference program 22 displays a formal mark image. In addition, if a user points a mark with a mouse, a menu is displayed. Using the menu, an action can be selected to obtain various kinds of information about mark authentication. Moreover, when on-line authentication of the mark is instructed, the mark reference program 22 accesses the mark authentication server 4 via the browser 21 and the network 9 to obtain information about whether or not the mark attached to the Web page is appropriate. The mark reference program 22 may be included in the browser 21 as its part.

The mark image attached to the Web page 11 and the digital watermark information embedded in the mark image can be treated as a transmission medium. It is because the transmission medium is transmitted between the mark issuer server 1 and the mark provider server 2 and between the mark provider server 2 and the user client 3 via the network 9.

The mark reference program 22, or a program of the browser 21 that includes the mark reference program 22 can be delivered, as a transmission medium, from a destination server to the user client 3 via the network 9. In addition, the mark reference program 22, or the program of the browser 21 that includes the mark reference program 22 can be stored in a storage medium such as CD-ROM and delivered.

Figure 2:
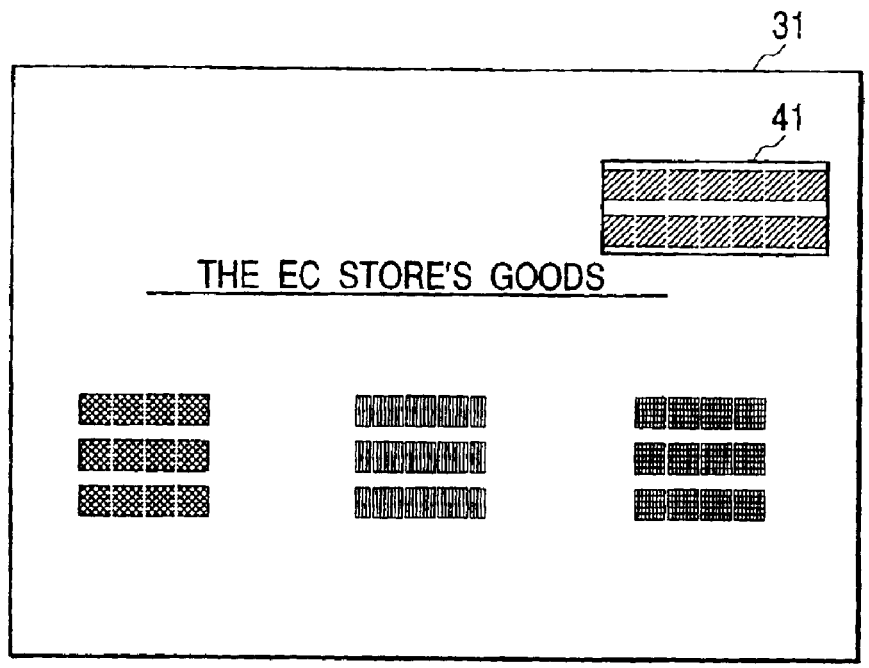
FIG. 2 is a diagram illustrating an example of a Web page to which a mark is attached.
Figure 3:
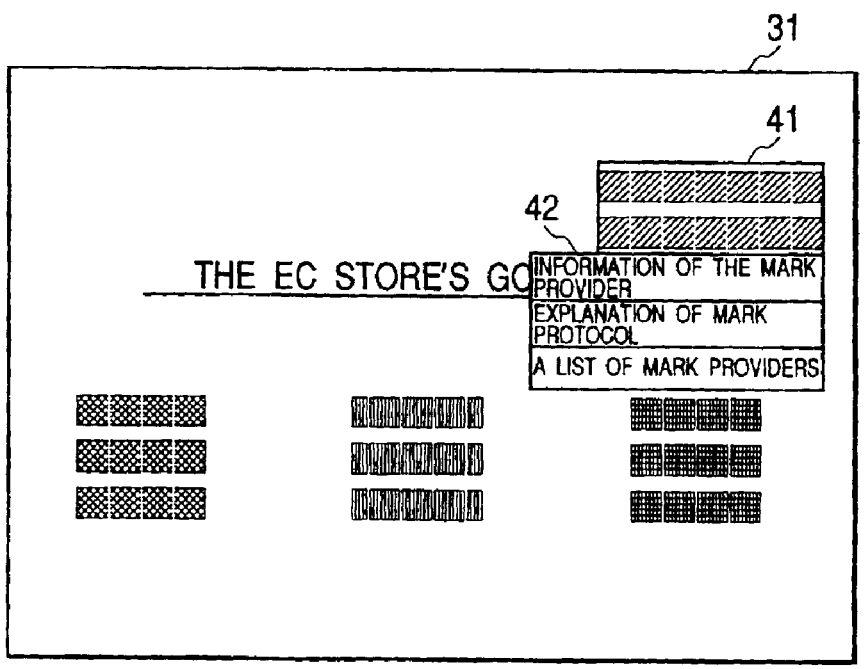
FIG. 3 is a diagram illustrating an example of a menu displayed when a mark is pointed.

FIG. 2 is a diagram showing Web page 31 that is transmitted from the mark provider server 2 and that is displayed on a display unit by the browser 21 of the user client 3. The mark reference program 22 displays a mark 41 on the Web page 31. FIG. 3 is a diagram illustrating information displayed in a menu 42 as a result of pointing the mark 41 on the same Web page 31 with a mouse. The menu 42 displays several menu items for providing users with information related to the mark. Selecting one of the menu items causes the mark reference program 22 and the browser 21 to display specified information on the display unit.

FIG. 4 is a diagram illustrating an example of text information that is displayed in a dialog window 44 when a menu item of "Information of the Mark Provider" is pointed. The text information states that the mark promoter allows the mark provider who issued the Web page to use an authentication mark, and also states information about the mark provider. "Inquiry to Authentication Server" button 45 is a button for instructing on-line authentication so as to call the mark authentication server 4 to verify this "Information of the Mark Provider". Using the on-line authentication, the user can detect a mark provider of which mark use has been stopped or canceled before an effective mark period even though a formal mark is attached to the Web page 31. "Information of the Promoter" button 46 is a button for accessing a Web page issued by the mark promoter to obtain information about the mark promoter. "OK" button is a button for returning control to the browser 21.

FIG. 5 is a diagram illustrating an example of Web page 61 that is obtained from the mark authentication server 4 via the browser 21 when the "Inquiry to Authentication Server" button 45 is pressed. The Web page 61 states that the mark provider is authorized to use the mark, and also states information about the mark provider.

FIG. 6 is a diagram illustrating an example of text information displayed in a dialog window 47 when a menu item of "Explanation of Mark Protocol" is pointed. This example explains the origin of the on-line mark protocol, contents embedded in a mark, and which authentication check is performed.

FIG. 7 is a diagram illustrating an example of home page 62 that is obtained through the browser 21 when a menu item of "A List of Mark Providers" is pointed. The home page 62 contains a list of sites provided with the authority to use the same mark by the mark issuer server 1. Because each site has URL of its home page, a user can browse a specific site's home page by pointing an appropriate URL.

Figure 8:
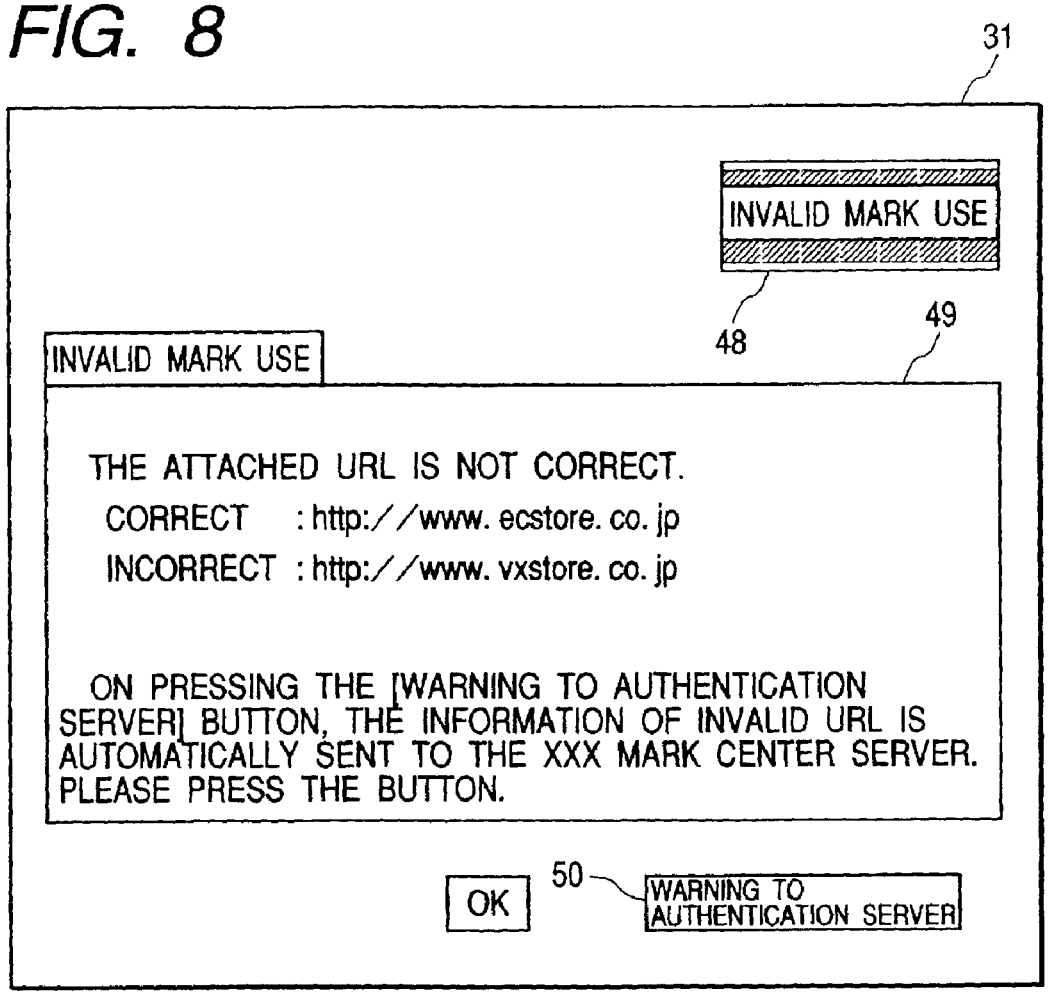
FIG. 8 is a diagram illustrating an example of a mark and text information that are displayed when URL discrepancy is detected as a result of off-line authentication of the mark.
Figure 9:
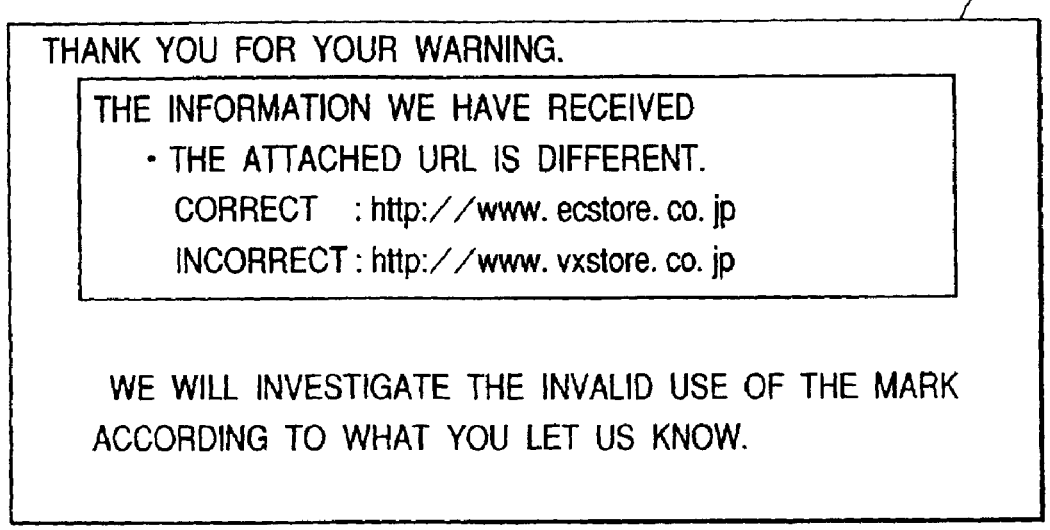
FIG. 9 is a diagram illustrating an example of a response sentence from an authentication server, which is displayed in a Web page.

FIG. 8 is a diagram showing the following: a mark 48 displayed when discrepancy between URL of the mark provider server 2 embedded in the mark and URL of the home page is detected as a result of off-line authentication of the mark; and an example of text information displayed in a dialog window 49 generated as a result. "Warning to Authentication Server" button 50 is a button for warning the mark authentication server 4 of the URL discrepancy. FIG. 9 is a diagram illustrating a response sentence from the authentication server 4, which is displayed in Web page 63.

FIGS. 10A and 10B are diagrams that define data classes of data, embedded in a mark as digital watermark information, and their contents. The data definition comprises a code showing a data class and data. There are data directly referred to and data that includes a referred entity-item data number as an index. The latter is data that is indirectly referred to through a specified entity-item number.

'Character code', which is D1, indicates a character code representing data such as JIS and ASCII. 'Object nation code', which is D2, is a double-byte character representing an object nation specified by ISO 3166; if the object nation is Japan, the object nation code is JP. D3 is 'name of mark issuer'. D4 is URL of a server related to a mark issuer. D5 is 'name of mark promoter'. D6 is URL of a server related to a mark promoter. D7 is identifier (ID) given to the mark for which the authority to use is provided.

D8 defines initialization. 'Definition item of mark display action' indicates No. of an entity item that specifies an action for an initially displayed mark. If the number is 0, nothing is displayed. 'Definition item of initial action' indicates No. of an entity item that specifies an action to be subsequently executed. D9 defines a menu configuration to be displayed when a mark is clicked. 'Number of menu items' defines number of menu items to be displayed. 'A list of action definition items' indicates No. of an entity item that defines an action to be executed when each menu item is selected. A name of each action is displayed as a menu item name.

D10 defines an action to be executed if a mark is displayed after off-line authentication of a Web page to which the mark is attached. 'Number of actions' is number of executable actions. 'A list of definition items of mark display action' shows a list of entity item Nos. that define each action. D11 defines an action to be executed when text is displayed after off-line authentication. 'Number of actions' is number of executable actions. 'A list of definition items of text display action' shows a list of entity item Nos. that define each action. D12 defines a URL of at least one Web page to which the mark is attached. 'Number of attached URLs' is number of URLs for Web pages to which the mark is attached. Attached page URL, which has a not-omissible portion and a omissible portion as a set, defines at least one set.

In FIG. 10B, D13 defines 'number of attached IP addresses', 'IP version code of server IP address on attached page', and its 'IP address data' as information about IP addresses of servers in which each attached page exists. D14 defines 'start of mark period' by 'starting year, month, day, hour, min'. D15 defines 'end of mark period' by 'ending year, month, day, hour, min'. D16 defines a hash value, as 'characteristic value of the contents', obtained from contents of a Web page. D17 defines URL of an authentication server that performs on-line authentication of a Web page to which the mark is attached.

D18 is 'action for mouse HOVER', and defines No. of an entity item that defines an action executed when a mouse cursor is put on a mark. D19 is 'action for mouse LEAVE', and defines No. of an entity item that defines an action executed when a mouse cursor on a mark is moved off the mark.

D20 is 'action for pressing of mouse left button', and defines No. of an entity item that defines an action executed when on a mark a mouse left button is pressed. D21 is 'action for pressing of mouse right button', and defines No. of an entity item that defines an action executed when on a mark a mouse right button is pressed.

D22 is special data for defining an action. 'Action name' is a name representing the action, which is defined only when the action name is an object to be displayed. 'Action class code' is a code representing an action class. The details of 'Action class code' are defined by definitions of action class codes shown in FIGS. 11A and 11B. 'Action class specific data' defines data required to execute the action. D23 is a general purpose IP address, and specifies an IP version code. D24 is 'general purpose URL', and defines URL of a Web page other than an authentication page of an authentication server. D25 is 'text', and defines information to be displayed in a dialog window that is generated in relation to a Web page to which the mark is attached.

FIGS. 11A and 11B are diagrams that define action class codes and their specific data. The action definition has a data configuration comprising: an action code representing an action class; and a parameter portion that is data required for the action. The action definition of 'menu display' (A1), however, does not include a parameter portion in the action definition because it refers to 'definition of menu configuration' (D9) as data implicitly. Parameter portions of 'mark display' (A7) and 'execution of add-on program' (A8) are data that is directly referred to. Parameter portions of the other action definitions include a referred entity-item No. as an index. In other words, an indirect addressing method, by which data is referred to through a specified entity-item No., is used.

'Menu display' action, which is A1, displays a pop-up menu that is specified in the item of 'definition of menu configuration' defined in D9. Action data is specified in an action definition item accessed through 'definition of menu configuration'. An entity-item No. of 'definition of menu configuration' may be specified as an action data. 'Off-line authentication', which is A2, performs authentication by comparing information obtained from reference environment with authentication information in an entity, and then generates an authentication result code. Based on this authentication result, the mark is displayed according to 'definition item of mark display after authentication'. In addition, if 'definition item of text display after authentication' is not 0, text is displayed according to this. 'Balloon display', which is A3, generates a window having only frame lines, and then displays text information of an item specified by 'item number of displayed text' in this window.

'Text display', which is A4, generates a dialog window having an action name defined in D22 as a title, and then displays information of fixed text specified by 'item number of displayed text' in this window. In addition, if variable information is inserted in the text, a text, which is defined by 'number of objects inserted in the text' and 'object information inserted in the text', is inserted in the text before displaying it. The 'object information inserted in the text' is an entity-item No. for specifying the inserted text, or is a system information code. Moreover, if a button is displayed in addition to the text, 'number of additional buttons' and 'a list of definition items of action for additional button' are specified. A definition item of action for additional button specifies an action that is executed when the button is pressed.

'Web page display', which is A5, obtains a Web page specified in an URL item, and display it in a new browser window. The URL item is an URL representing the location of the Web page. 'Action item number on extinction of link destination' refers to a link destination existence flag, and defines No. of an entity item that specifies an action to be executed when the link destination becomes extinct. Not performing link check at the time of initialization results in invalid. In addition, if the 'action item number on extinction of link destination' is 0, no action is performed when link destination becomes extinct.

'Communications with server', which is A6, issues a request specified by 'request class code' to a server specified by 'server URL item number', and processes response data received from the server according to 'response processing code'. 'Mark display', which is A7, applies an effect specified by 'image effect code' to a mark image, and overlays a text specified by 'synthesized text' on the mark image before displaying it. The text is displayed according to 'text body color code', 'text frame color code', and 'font code'. The text is synthesized only when it is instructed by the 'synthesized text'.

In FIG. 11B, 'execution of add-on program', which is A8, interprets a program described in a script language as action data, and then executes the program. The program description in the script language may be specified in 'text' of D25. An entity-item number of this 'text' may be specified in action data of action definition.

At the time of initialization, 'link check' of A9 checks whether or not extinction of a Web page related to mark authentication, or the like, causes inaccessibility, and then stores the result in memory as a link destination flag. 'General purpose URL item number' is No. of an entity item that stores an object URL. 'Action on OK item number' is No. of an entity item that defines an action to be executed when contents could be accessed. 'Action on NG item number' is No. of an entity item that defines an action to be executed when contents could not be accessed. When a Web page could be accessed, the Web page is not displayed. If an action item number is 0, the action is not performed.

FIGS. 12A through 12F are diagrams illustrating examples of a data entity embedded in a mark as digital watermark information. 'Item No.' at the top of each line acts as an index that can be referred to, as a parameter, from the other entity item data. 'D code' is a code representing a data class. The top of an entity item that specifies an action definition is an action name. However, as regards an action definition that defines an action executed when a menu item is pointed, an action definition that defines an action executed when a button is pressed, and an action definition that defines an action for opening a dialog window to display a text, the top of the entity item is also used as a label or a title. " " is set to an action name of an action definition that does not use a label or a title.

Character code, object nation code, name of mark issuer, mark issuer URL, name of mark promoter, mark promoter URL, and individual mark ID are set to item Nos. 1 through 7 respectively. Item No. 8 shows initialization, item No. 17 defines a mark display action, and item No. 15 defines an initial action after displaying the mark. Item No. 17 indicates that A7 action (mark display) is performed with a text "in authentication" overlaid on the mark. Item No. 15 specifies the following: A2 action (off-line authentication) is performed; and a mark is displayed according to item No. 10 after the off-line authentication. Item No. 10 specifies the following: a mark is displayed after off-line authentication; if a result of the authentication is correct, the mark is displayed according to item No. 21; if URL is invalid, the mark is displayed according to item No. 22; and if effective period of the mark expires, the mark is displayed according to item No. 24. Item No. 21 specifies that a formal mark is displayed without image effect and synthesized text.

Item No. 12 specifies that balloon is displayed according to item No. 14 when detecting that a mouse cursor is put on a mark. Item No. 14 specifies that A3 action (balloon display) is performed and a text specified in item No. 32 is displayed in the balloon.

Item No. 13 specifies that a menu is displayed according to item No. 16 when on a mark a mouse left button is pressed. Item No. 16 specifies that Al action (menu display) is performed. Item No. 9 specifies a menu configuration. Judging from the menu configuration, the menu has three items and item names are specified in item Nos. 18, 19, and 20.

Item No. 18 specifies the following: when "Information of the Mark Provider" item is pointed, a mark is displayed according to item No. 10 after off-line authentication; and then a text is displayed according to item No. 11. Item No. 11 specifies the following: if a result of authentication is correct, a text is displayed according to item No. 26; if URL is invalid, the text is displayed according to item No. 23; and if effective period expires, the text is displayed according to item No. 25. Item No. 26 specifies A4 action (text display) to be executed. Fixed text information is specified in item No. 38. Variable information to be inserted in a text is specified in item Nos. 39, 40, 41, 42, and 35. In addition, two additional buttons are provided. The names of those buttons are specified in item Nos. 27 and 28. Item No. 27 specifies that A6 action (communications with server) is executed when "Inquiry to Authentication Server" button is pressed. Server URL is specified in item No. 31. A request code to the server is 1, and a response processing code is 3. Item No. 28 specifies A5 action (Web page display) to be executed when "Information of the Promoter" button is pressed. The URL is specified in item No. 6.

Item No. 19 instructs that a menu is displayed according to item No. 33 when "Explanation of Mark Protocol" item is selected. There is no variable information to be inserted in a text and no additional button.

Item No. 20 specifies that Web page display is performed when "A List of Mark Providers" item is selected. URL of the Web page is specified in item No. 30.

Item No. 22 indicates the following: if off-line authentication proves URL to be invalid, a mark is displayed with a text "invalid mark use" overlaid on the mark; and then the text is displayed according to item No. 23. Item 23 specifies that a dialog window with a title of "invalid mark use" is generated to display a text. Fixed text information is specified in item No. 34. Variable information to be inserted in a text is specified in item Nos. 35 and 1. URL of the Web page is overlaid on an entity of item No. 1. In addition, one additional button is provided. The name of the button is specified in item No. 29.

Item No. 24 indicates the following: if off-line authentication proves expiration of effective period, a mark is displayed with a text "expiration of effective period" overlaid on the mark; and then the text is displayed according to item No. 25. Item 25 specifies that a dialog window with a title of "expiration of effective period" is generated to display a text. Fixed text information is specified in item No. 36. Variable information to be inserted in a text is item No. 37 and current time specified by system information code S1. In addition, one additional button is provided. The name of the button is specified in item No. 29.

FIG. 12E is a diagram illustrating an example of an entity relating to link check. Item No. 3 specifies that on initialization an initial action shown in item No. 4 is executed. Item No. 4 indicates the following: A9 action (link check) is executed; a Web page of which URL is shown in item No. 2 is accessed; if the contents could be accessed, a link destination existence flag on the memory is set to 'OK'; and a mark display action of item No. 5 is executed. As regards item No. 5, a character string 'OK' are overlaid on a mark image to be displayed. If the contents could not be accessed, the flag on the memory is set to 'NG' and a mark display action of item No. 6 is executed. As regards item No. 6, a character string 'NG' is overlaid on the mark image to be displayed. When "A List of Mark Providers" menu item or button is pressed, an action definition specified in item No. 1 is executed. In other words, the link destination existence flag is referred to for checking whether or not a general purpose URL specified in item No. 2 is accessible. If this flag is 'NG', a link destination Web page specified in item No. 2 is not accessed. Accordingly, a Web page that is being displayed is not changed. If this flag is 'OK', the link destination Web page is accessed through the browser 21, and then the Web page is displayed.

If 'action item number on extinction of link destination' is specified in item No. 1, an action of specified entity item such as text display is executed.

FIG. 12F is a diagram illustrating an example of an entity related to execution of an additional program embedded in a mark image. Item No. 1 specifies that an additional program of item No. 2 is executed when detecting that a mouse cursor is put on a mark. Item No. 2 executes a processing program described in a data portion. As an example of the additional program processing, when a mouse cursor is put on a mark image, a balloon is displayed and a scrolling text is displayed in the balloon.

Such additional program enables us to add a function that cannot be described by the above-mentioned entity items.

By the way, a digital signature for digital watermark information as a whole is set at the end of the digital watermark information.

FIGS. 13A through 13D are flowcharts illustrating a processing flow of a mark reference program 22. The mark reference program 22, controlled by the browser 21 that displays Web page 31 and detects a mark extension, extracts digital watermark information embedded in a mark image (step 71). Next, a digital signature embedded in a mark is verified (step 72). If the digital signature is proved to be unauthorized, processing is stopped. If the digital signature is correct, the digital watermark information is expanded on the memory to create a data entity (step 73). In the next place, data of the data class 8 in the data entity is referred to for initialization, an initial mark is displayed (step 74), and off-line authentication is performed (step 75). If a result of the authentication is correct (step 76, OK), a mark 41 is displayed on the Web page 31 (step 77). When the mark 41 is clicked, the menu 42 is generated according to data of the data class 9 and then the menu is displayed on the Web page 31 (step 78).

Figure 13A:
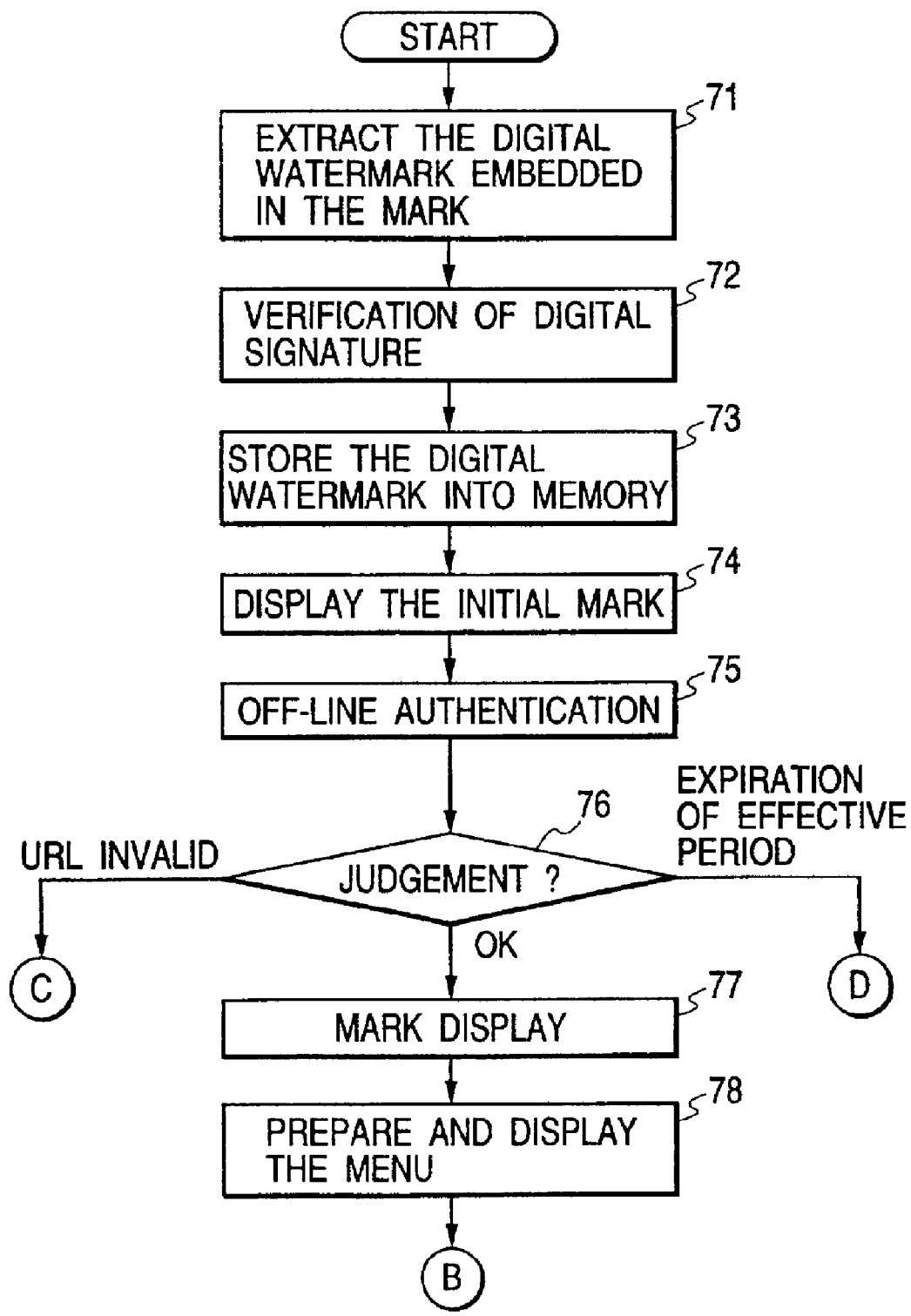
FIG. 13A is a flowchart illustrating a processing flow of mark reference program 22 in an embodiment.
Figure 13B:
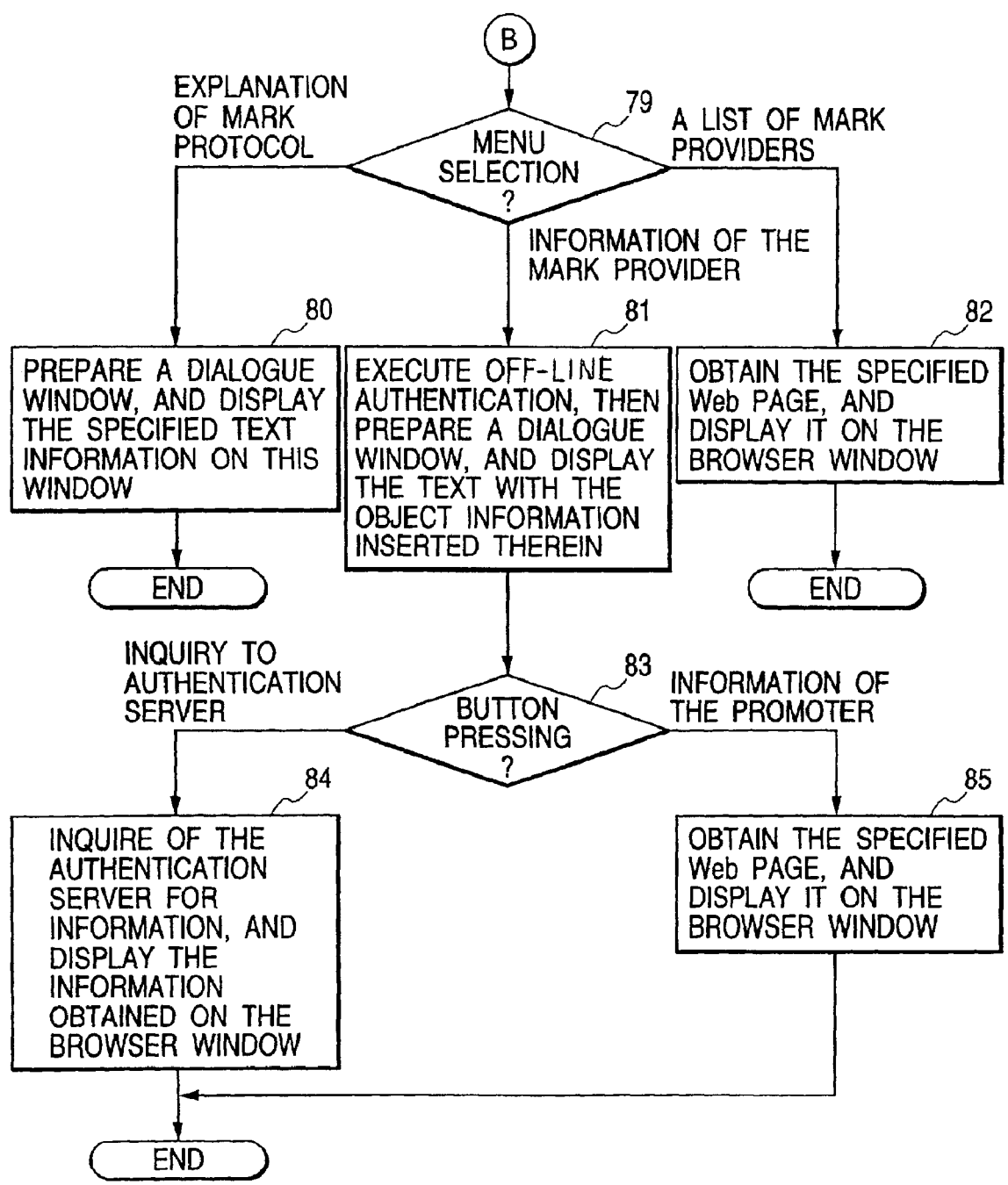
FIG. 13B is a flowchart illustrating a processing flow of mark reference program 22 in an embodiment (continued)

In FIG. 13B, when "Explanation of Mark Protocol" menu item is selected (step 79—explanation of mark protocol), the mark reference program 22 generates the dialog window 47, and displays specified text information in this dialog window 47 (step 80). If 'A List of Mark Providers' menu item is selected (step 79—a list of mark providers), the mark reference program 22 obtains the specified Web page 62 through the browser 21 and displays the page in a browser window (step 82).

If "Information of the Mark Provider" menu item is selected (step 79—information of the mark provider), the mark reference program 22 executes off-line authentication. If a result of the authentication is correct, the mark reference program 22 generates the dialog window 44, and displays the text with the object information inserted therein (step 81). At this time, "Inquiry to Authentication Server" button 45 and "Information of the promoter" button 46 are displayed. When "Inquiry to Authentication Server" button 45 is pressed (step 83—inquiry to authentication server), the mark reference program 22 inquires of the mark authentication server 4 through the browser 21, and displays obtained Web page 61 in the browser window (step 84). The mark reference program 22 transmits information, which is required for online authentication, including URL of the mark provider, URL of Web page to which the mark image is attached, and mark period, to the mark authentication server 4 through the browser 21. When "Information of the Promoter" button 46 is pressed (step 83—information of the promoter), the mark reference program 22 obtains a Web page from a server related to the mark promoter through the browser 21, and then displays the Web page in the browser window (step 85).

Figure 13C:
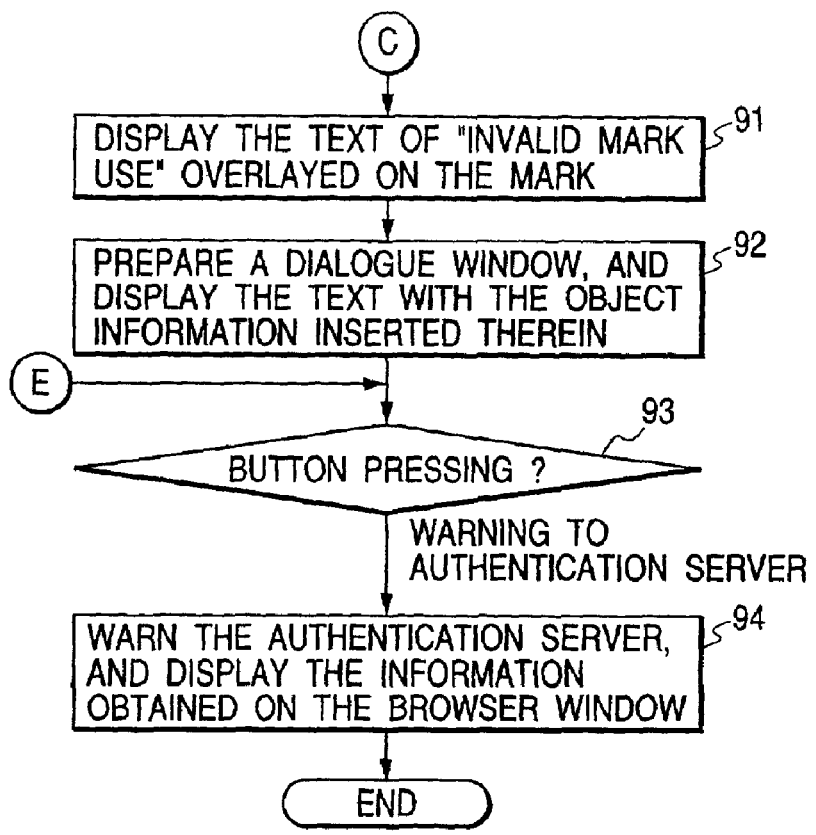
FIG. 13C is a flowchart illustrating a processing flow of mark reference program 22 in an embodiment (continued)

In FIG. 13C, as a result of the off-line authentication, when the mark reference program 22 detects invalid URL use (step 76—URL invalid), the program displays a mark 48 on which the text of "invalid mark use" is overlaid (step 91), generates the dialog window 49, and displays the text with the correct URL and URL of the Web page, which is being referred to, inserted therein (step 92). At this time, "Warning to Authentication Server" button 50 is displayed. When the mark reference program 22 detects that "Warning to Authentication Server" button 50 is pressed (step 93—warning to authentication server) the program warns the mark authentication server 4, and displays obtained Web page 63 in the browser window (step 94).

Figure 13D:
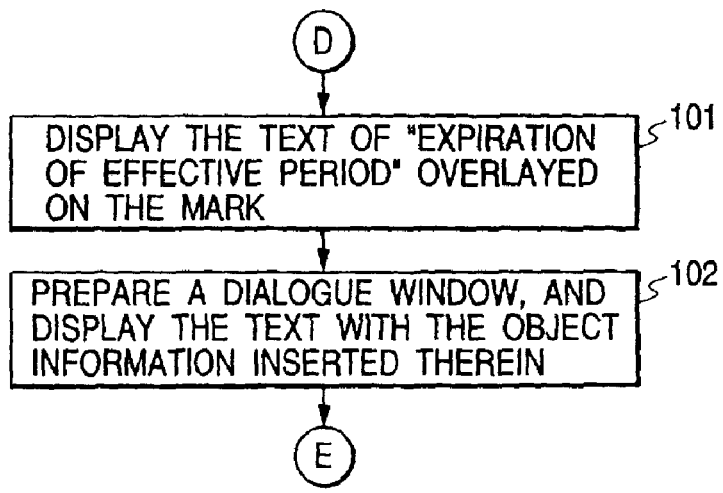
FIG. 13D is a flowchart illustrating a processing flow of mark reference program 22 in an embodiment (continued).

In FIG. 13D, as a result of the off-line authentication, when the mark reference program 22 detects expiration of effective period (step 76—expiration of effective period), the program displays a mark on which the text of "expiration of effective period" is overlaid on the mark (step 101), generates a dialog window, and displays the text with effective period and current time inserted therein (step 102). Because "Warning to Authentication Server" button 50 is displayed at this time, the steps 93 and 94 described above can be performed.

It should be noted that, in step 74, data of the data class 8 in the data entity is retrieved before an initial mark is displayed, but if the data of the data class 8 in the data entity does not exist, conditions of waiting for operation may be provided after retrieving "|A7|0|" data in item No. 21 and displaying the formal mark 41.

In addition, a menu item for instructing off-line authentication may also be provided. In this case, when "Off-line Authentication" is selected, A2 (off-line authentication) is performed. According to this method, it becomes possible to perform the following: first, the normal mark 41 is displayed; when the mark 41 is clicked, the menu 42 including "Off-line Authentication" is displayed; and when "Off-line Authentication" menu item is selected, off-line authentication is performed. Moreover, a menu item for instructing on-line authentication may also be provided so that it becomes possible to instruct on-line authentication immediately after displaying the mark 41.

Furthermore, in step 81, when "Information of the Mark Provider" menu item is selected, the off-line authentication, which is the same as that performed in step 75, is repeated. However, the text may be displayed immediately without performing the off-line authentication.

In this embodiment, when "A List of Mark Providers" provided as a menu item or "Information of the Promoter" button provided as a button is selected, the specified Web page is obtained and displayed in a browser window. In such a manner, using a Web page obtaining means, a user can obtain documents such as a written oath sworn by a mark provider, contract documents, and covenants. The user can also check the authenticity of those documents by performing mark authentication in a similar manner and verifying a digital signature provided by a mark promoter and the like.

According to this embodiment, the number of items to be displayed when a mark is pointed, names of menu items and their actions can be specified for each mark. In addition, an order of processing can be designed in response to each mark; for example, an order of off-line authentication action and mark display action is specified for each mark. In addition, a text, which is displayed in a dialog window when a menu item or a button is pressed, can be specified for each mark. And by inserting information related to a mark provider in a variable portion of the text, a text including information specific to the provider who attaches the same mark can be generated. Moreover, when a user instructs to display a Web page that cannot be accessed by the user, it is possible to notify the user, without changing a display screen, that the link destination does not exist. Furthermore, as digital watermark information, an entity of an additional program can be embedded in a mark image. Therefore, it is possible to add processing involved in mark authentication that cannot be described by the data definitions and the action definitions described above.

As described above, settings of digital watermark information can be changed for each kind of mark. In such a manner, without changing the mark reference program 22, it is possible to specify authentication-related information of the mark and to add a function.

As mentioned above, according to the present invention, because a data format of digital watermark information embedded in a mark image is specified, and because entity items for specifying data and entity items for defining actions can be designed freely, it is possible to change processing procedures according to a kind of mark, and to specify the number of menu items to be displayed, names of menu items and their actions freely. In addition, a program, which refers to digital watermark information having such data format, can provides a user with several means for verifying authenticity of a mark and of a home page to which the mark is attached; for example, off-line authentication, on-line authentication, explanation of mark protocol purport, a guarantee letter by a mark provider, and the like. Moreover, when invalid mark or invalid attachment of a mark is detected, the program can provide the user with a means for notifying it to an authentication server. Even in the case of the same mark, it is possible to make contents of text information to be displayed variable according to a mark provider. Furthermore, because a function of adding a program is provided, processing that cannot be described by the specified data definitions and the specified action definitions can be added.

In this manner, abundance of the data description formats in digital watermark information itself and the function of adding an additional program enable to design a data entity embedded in a mark in response to a kind of mark by means of digital watermark technology, without changing a mark reference program and a browser including the program, and to perform a variety of mark authentication processing. Additionally, because we can include text information in the digital watermark information and display it in a dialog window, this function enables us to avoid communication for obtaining a Web page through Internet.

What is claimed is:

1. A method for referring to digital watermark information embedded in a mark image, said digital watermark information including action definition information and its referenced data, and performing processing with reference to the digital watermark information, said method comprising the steps of:

receiving the mark image that embeds the digital watermark information, said digital watermark information containing both the action definition information and the referenced data different from one mark image to another, said referenced data including use conditions of the mark;

extracting the digital watermark information from the received mark image;

authenticating said use conditions in the digital watermark information by executing the action definition to see if said use conditions are satisfactory;

displaying the mark image on a display unit in accordance with the authentication result by executing the action definition; and displaying information relevant to the mark image on the display unit by executing the action definition, when the displayed mark image is pointed at.

2. A method for referring to digital watermark information according to claim 1, wherein the step of displaying a mark image displays a display meaning that said mark image is being invalidly used on the display unit when said use conditions are judged to be unsatisfactory.

3. A method for referring to digital watermark information according to claim 1, wherein the step of displaying a mark image displays a display meaning that said mark image is being invalidly used on the display unit when said use conditions are judged to be unsatisfactory, further informing a mark authentication server of an occurrence of the invalid mark use.

4. A method for referring to digital watermark information according to claim 1, wherein said use conditions include both a URL of use permitted site and an effective period.

5. A method for referring to digital watermark information according to claim 4, wherein the step of authenticating said use conditions displays a display meaning that the URL is invalid on the display unit when said URL of use permitted site proves invalid.

6. A method for referring to digital watermark information according to claim 4, wherein the step of authenticating said use conditions displays a display meaning that the URL is invalid on the display unit when said URL of use permitted site proves invalid, further informing a mark authentication server of an occurrence of the invalid mark use.

7. A method for referring to digital watermark information according to claim 4, wherein the step of authenticating said use conditions displays a display meaning that the effective period has been expired on the display unit when said effective period proves out of date.

8. A method for referring to digital watermark information according to claim 4, wherein the step of authenticating said use conditions displays a display meaning that the effective period has been expired on the display unit when said effective period proves out of date, further informing a mark authentication server of an occurrence of the invalid mark use.

* * * * *